United States Patent
Uehara et al.

(10) Patent No.: US 10,322,706 B2
(45) Date of Patent: Jun. 18, 2019

(54) STOP MAINTAINING SYSTEM OF VEHICLE

(71) Applicant: Mazda Motor Corporation, Aki-gun, Hiroshima (JP)

(72) Inventors: Shigeyuki Uehara, Hiroshima (JP); Masaru Takase, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 248 days.

(21) Appl. No.: 15/372,099

(22) Filed: Dec. 7, 2016

(65) Prior Publication Data
US 2017/0182991 A1 Jun. 29, 2017

(30) Foreign Application Priority Data
Dec. 28, 2015 (JP) ................ 2015-255650

(51) Int. Cl.
*B60T 13/74* (2006.01)
*B60T 8/24* (2006.01)
(Continued)

(52) U.S. Cl.
CPC ............ *B60T 13/741* (2013.01); *B60T 7/042* (2013.01); *B60T 7/085* (2013.01); *B60T 7/122* (2013.01);
(Continued)

(58) Field of Classification Search
CPC ........ B60T 13/741; B60T 13/662; B60T 7/12; B60T 2/245; B60T 8/48; B60T 2201/06
(Continued)

(56) References Cited

U.S. PATENT DOCUMENTS

2005/0246081 A1* 11/2005 Bonnet .................. B60T 7/122
701/38
2008/0133084 A1* 6/2008 Weinmann .......... H04M 1/6083
701/36
(Continued)

FOREIGN PATENT DOCUMENTS

JP 2008008425 A 1/2008
JP 2013184546 A 9/2013
(Continued)

*Primary Examiner* — Bradley T King
*Assistant Examiner* — James K Hsiao
(74) *Attorney, Agent, or Firm* — Alleman Hall Creasman & Tuttle LLP

(57) ABSTRACT

A vehicle stop maintaining system is provided, which includes a foot brake mechanism, a brake force control mechanism having a pressurizer and for braking the vehicle wheels by controlling the pressurizer independently from depression of a brake pedal, a controller for maintaining a vehicle stopped state by operating the brake force control mechanism when the stopped state is detected, and operating an automatic stop control, an automatic stop mode switch for selecting ON/OFF states of the automatic stop control upon receiving an input from a vehicle driver, and a control mechanism for controlling a given mechanism that is different from the brake force control mechanism, and operating the brake force control mechanism in response to a given operation by the driver. When the given operation is performed on the control mechanism by the driver, the controller switches the selected one of the ON/OFF states to the other state.

15 Claims, 8 Drawing Sheets

(51) Int. Cl.
    *B60T 7/04*           (2006.01)
    *B60T 7/08*           (2006.01)
    *B60T 7/12*           (2006.01)
    *B60T 13/58*         (2006.01)
    *B60T 13/66*         (2006.01)
    *B60T 8/48*           (2006.01)

(52) U.S. Cl.
    CPC ............ *B60T 8/245* (2013.01); *B60T 13/588* (2013.01); *B60T 13/662* (2013.01); *B60T 8/48* (2013.01); *B60T 2201/06* (2013.01)

(58) Field of Classification Search
    USPC .......................................................... 701/36
    See application file for complete search history.

(56) References Cited

U.S. PATENT DOCUMENTS

| | | | |
|---|---|---|---|
| 2008/0294319 A1* | 11/2008 | Baijens | B60T 8/24 701/70 |
| 2011/0136625 A1* | 6/2011 | Yu | B60W 10/06 477/185 |
| 2013/0184954 A1* | 7/2013 | Treppenhauer | B60T 7/122 701/70 |
| 2014/0350828 A1* | 11/2014 | Heintze | B60T 17/22 701/113 |
| 2016/0001781 A1* | 1/2016 | Fung | B60W 40/08 701/36 |

FOREIGN PATENT DOCUMENTS

| | | |
|---|---|---|
| JP | 2015195553 A | 11/2015 |
| WO | 2015146003 A1 | 10/2015 |

\* cited by examiner

1: STOP MAINTAINING SYSTEM
3: FOOT BRAKE DEVICE
9: BRAKE PEDAL
11: HYDRAULIC BRAKE MECHANISM
12: VEHICLE WHEEL

STOP MAINTAINING SYSTEM OF VEHICLE

BACKGROUND

The present invention relates to a stop maintaining system of a vehicle, which is switchable of a brake force control state by operating a control mechanism capable of controlling various mechanisms which are different from a brake force control mechanism.

Conventionally, arts for reducing, when an auto hold switch of which ON and OFF modes are switchable therebetween is turned on and a vehicle is detected to be in a stopped state, a burden on a vehicle driver which accompanies depression of a brake pedal by automatically operating a brake force control device which is represented by an Anti-lock Brake System (ABS) or a Dynamic Stability Control (DSC) system, to automatically stop (auto hold) the vehicle, are proposed (e.g., JP2008-008425A).

The auto hold switch is provided to, for example, a center console, a vehicle driver is able to set a control mode relating to an auto hold execution control by turning on/off (switching operation of) the auto hold switch.

Generally, a manual switch, such as the auto hold switch, does not include a hold circuit, and a signal of H– (logic high) level is inputted to a controller (e.g., an electronic control unit (ECU)) only when the switch operation is performed by the driver, otherwise a signal of L– (logic low) level is inputted.

The controller sets an auto hold execution mode when the signal level is H, and sets an auto hold release mode when the signal level is L.

Further, in the auto hold execution mode, the controller performs the auto hold execution control upon detecting a stopped state of the vehicle.

JP2015-195553A discloses a mobile terminal operation system for a vehicle, which although is not related to a stop maintaining system of a vehicle including an auto hold switch, but includes a controller which receives an operation from a vehicle driver, and a system-side communicator for notifying to a mobile terminal operation information indicating the operation inputted to the controller. The mobile terminal operates according to an operation on a terminal-side user interface, and also operates according to the operation on the controller of which operational configuration is different from that of the terminal-side user interface.

Thus, even for an application which is activated based on an operation through a touch panel, it is possible to control it with intermittent input to the controller without focusing on a display screen.

For structural abnormality of the switch operation of the auto hold switch, there are ON and OFF failures.

When the signal level is switched from L to H, the controller switches the control mode from the auto hold execution mode to the auto hold release mode or from the auto hold release mode to the auto hold execution mode. Therefore, whichever failure occurs, the control mode is not settable.

Although the ON and OFF failures of the auto hold switch are electrically detectable by adopting a failure diagnosing mechanism etc. in an electric circuit, it causes an increase in cost and an intention of the driver remains not reflected, and thus, operational reliability of the auto hold control is not secured.

The mobile terminal operation system for the vehicle of JP2015-195553A is controllable of the single control target based on the different operational configurations of operations from the different user interfaces. Thus, even if one of the user interfaces fails, by operating the other user interface, it is still possible to control the control target intentionally.

However, with the art of JP2015-195553A, the control target is the mobile terminal and not the stop maintaining system of the vehicle including the auto hold switch. Therefore, it is difficult to provide both operational convenience and reliability to the driver.

For example, when an abnormality in the switch operation of the auto hold occurs, the driver usually notices it while the vehicle is traveling, therefore he/she needs to set a control mode of his/her need with a simple operation, and setting the control mode of the auto hold by the intermittent input to the application such as disclosed in JP2015-195553A is not realistic in terms of time, number of procedures etc. of the operation by the driver.

Further, to change the control mode according to the intention of the driver, even though the fixed signal level which is outputted to the controller simply needs to be inverted, a large-scale installation of the system-side communicator etc. is required, which may cause an increase in cost.

For this reason, to provide both the operational convenience and reliability to the driver, an enhancement of the stop maintaining system of the vehicle is needed.

SUMMARY

The present invention is made in view of the above issues, and aims to provide a stop maintaining system of a vehicle, which is capable of providing both operational convenience and reliability to a vehicle driver when an abnormality occurs in switching a mode of an automatic stop mode switch capable of switching ON and OFF states therebetween.

According to one aspect of the present invention, a vehicle stop maintaining system comprises a foot brake mechanism for braking vehicle wheels through hydraulic brake mechanisms, a brake force control mechanism having a pressurizer that increases hydraulic brake pressure to be applied to the hydraulic brake mechanisms, and for braking the vehicle wheels by controlling the pressurizer independently from depression of a brake pedal, and a controller comprising a processor configured to maintain a stopped state of the vehicle by operating the brake force control mechanism when the stopped state is detected, and operating an automatic stop control in which hydraulic brake pressure is released when a hydraulic brake pressure release condition is satisfied, is provided. The system further comprises an automatic stop mode switch for selecting one of ON and OFF states of the automatic stop control upon receiving an input from a vehicle driver, the ON state corresponding to execution of the automatic stop control, the OFF state corresponding to prohibition of the automatic stop control, and a control mechanism for controlling a given mechanism that is different from the brake force control mechanism, and operating the brake force control mechanism in response to a given operation by the driver. When the given operation is performed on the control mechanism by the driver, the controller switches the selected one of the ON and OFF states to the other state.

The system includes a control mechanism for controlling the given mechanism that is different from the brake force control mechanism, and operating the brake force control mechanism in response to the given operation by the driver. Thus, even if an abnormality in the switch operation of the automatic stop mode switch occurs, the control mechanism sets the automatic stop control to a mode intended by the driver.

The controller switches the ON/OFF state selected by the automatic stop mode switch to the other state when the control mechanism receives the given operation from the driver. Therefore even during traveling of a vehicle to which the system described above is mounted, the mode state is changed with a simple operation without requiring a mode state confirmation from the driver, and the control mode is changed even with the abnormality in the switch operation of the automatic stop mode switch.

The control mechanism may be a control device for operating a plurality of control items of vehicle instruments and the brake force control mechanism, and may include a touch panel display unit that has a display screen for displaying a plurality of virtual control switches corresponding to the control items, respectively, and a cursor for indicating the virtual control switches, and receives a direct operation from the driver on the virtual control switches displayed on the display screen, an input device disposed to be separated from the display screen and for moving the cursor, and a display controller for controlling display contents on the display screen.

According to the above structure, the mode state is easily switched from the mode associated with a signal level to the other mode by one of the direct operation from the driver on the virtual control switches and the operation through the input device.

The system may further include an ignition switch for detecting an ignition state of the vehicle. The display controller may have a memory for storing the selected one of the ON and OFF states. When switching the ignition state on after switching off once, the controller may automatically apply the one of the ON and OFF states selected before the ignition state is switched off.

According to the above structure, when switching the ignition state on after switching off once, the one of the ON and OFF states (control mode) selected by the driver before the ignition state is switched off is automatically applied without another switch operation of the automatic stop mode switch by the driver.

The system may further include an electric parking brake mechanism for braking the vehicle wheels by operating electric brake mechanisms that are driven by electric actuators, respectively, independently from depression of a brake pedal. The control mechanism may include an electric parking brake switch for controlling the operation of the electric parking brake mechanism.

According to the above structure, the mode state is easily switched from the mode associated with the signal level to the other mode by the operation of the electric parking brake switch.

When the electric parking brake switch is operated a plurality of times within a given period of time, the controller may switch the selected one of the ON and OFF states to the other state.

According to the above structure, the selection of the control mode and the operation of the electric parking brake mechanism are accurately controlled with the single operation of the electric parking brake switch.

The electric parking brake switch may be located near the automatic stop mode switch.

According to the above structure, the control mode is intentionally and smoothly selected with the operation of the electric parking brake switch.

DETAILED DESCRIPTION OF EMBODIMENT

Hereinafter, an embodiment of the present invention is described in detail with reference to the appended drawings.

The following description is an illustration of the present invention applied to a stop maintaining system of a vehicle, and is not intended to limit the scope of the present invention, application thereof, or usage thereof.

Hereinafter, the embodiment of the present invention is described with reference to FIGS. 1 to 8.

A vehicle V of this embodiment is mounted with a stop maintaining system 1.

Figure 1:
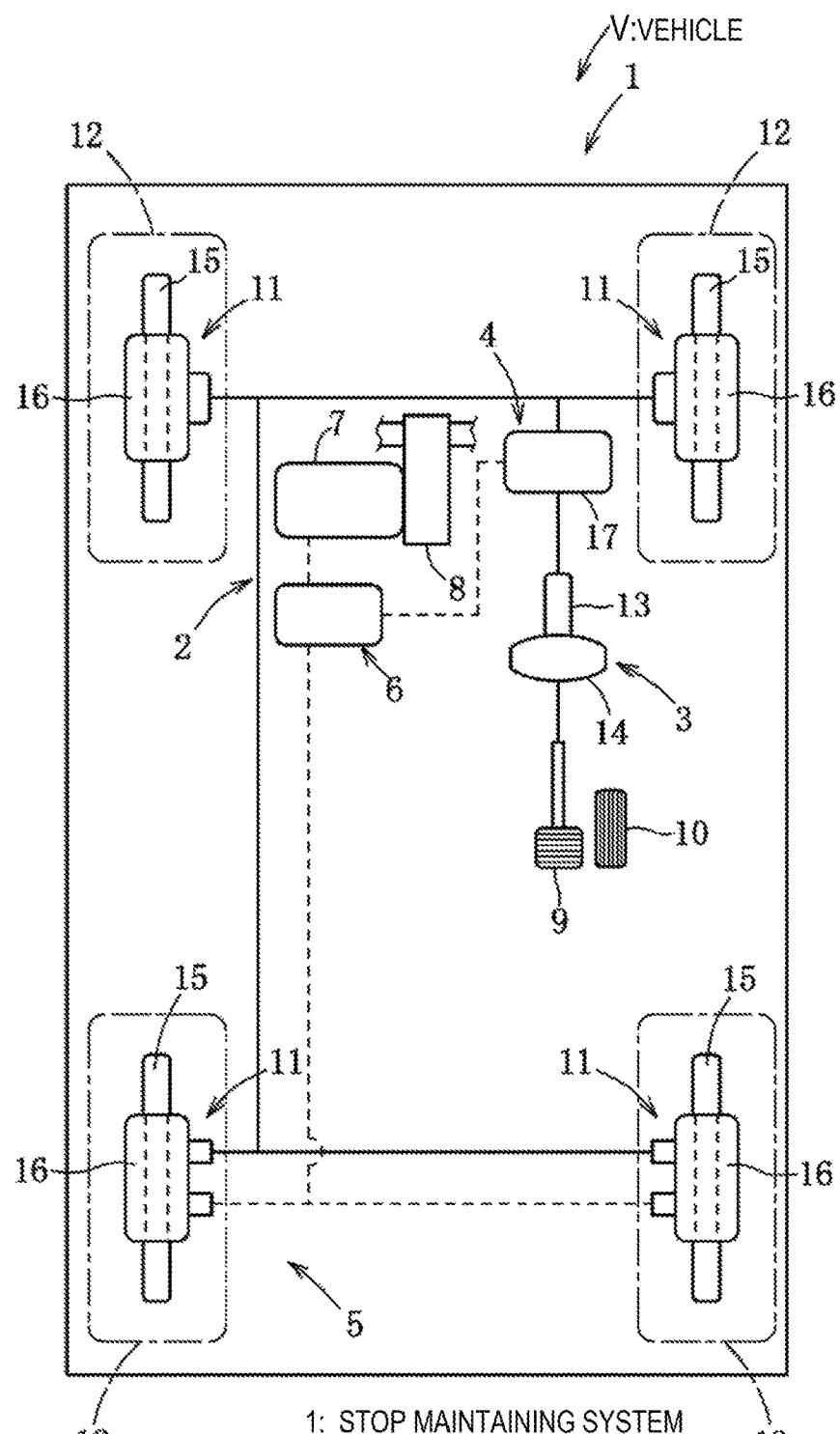
FIG. 1 is a schematic view of a vehicle on which a stop maintaining system of the vehicle according to one embodiment is mounted.
Figure 2:
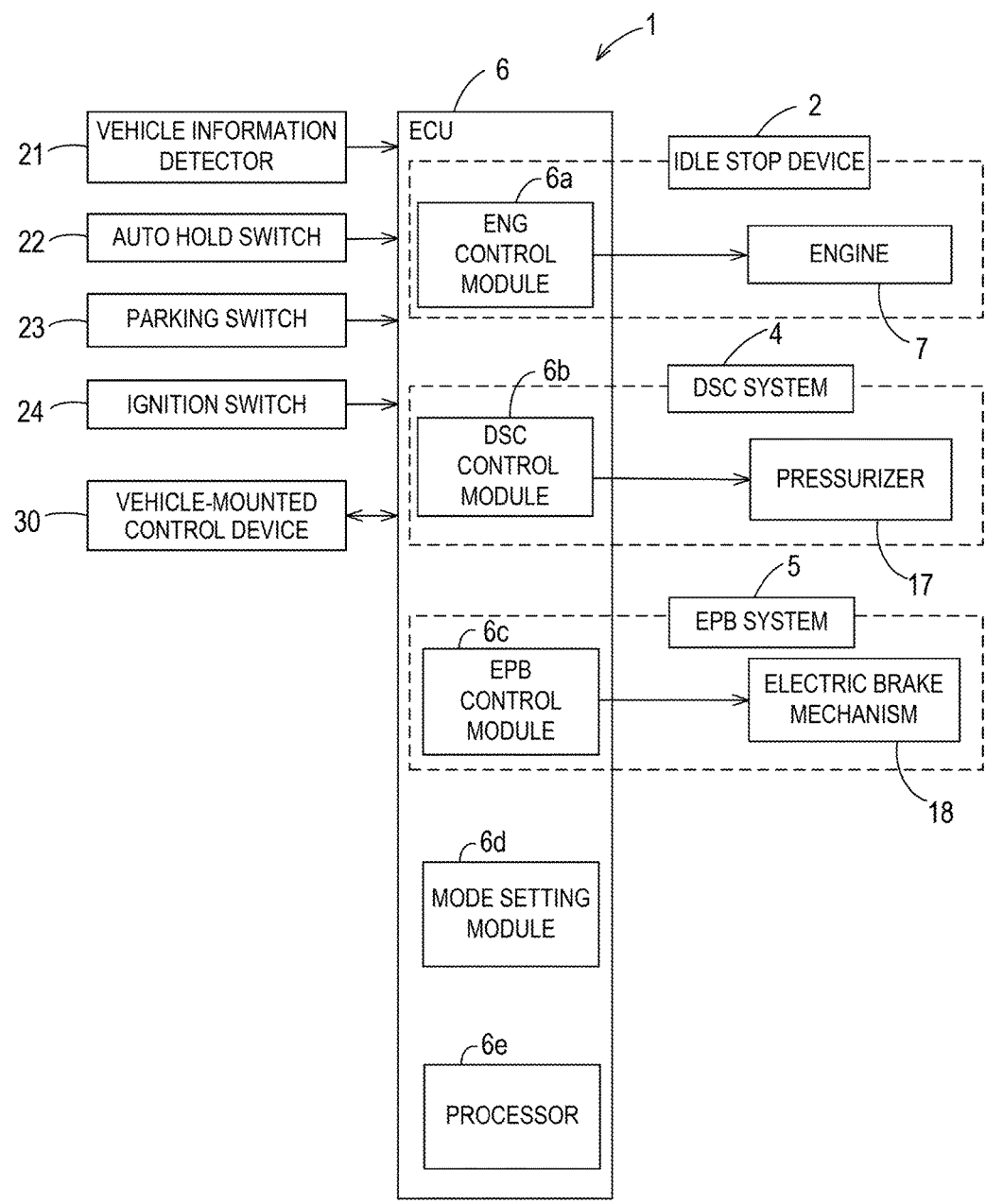
FIG. 2 is a block diagram of the stop maintaining system.

As illustrated in FIGS. 1 and 2, the stop maintaining system 1 includes an idle stop device 2, a foot brake device 3 (foot brake mechanism), a DSC (Dynamic Stability Control) system 4 (brake force control mechanism), an EPB (Electric Parking Brake) system 5 (electric parking brake mechanism), and an ECU (Electronic Control Unit) 6 (controller).

First, the idle stop device 2 is described.

The idle stop device 2 automatically stops and restarts an engine 7 according to an operating state of the vehicle V in a transmittable state of a drive force (drive torque) of the engine 7 to drive wheels.

As illustrated in FIG. 2, the idle stop device 2 is comprised of an ENG (Engine) control module 6a and the engine 7.

As illustrated in FIG. 1, the engine 7 transmits the drive force to an automatic transmission 8 by engaging clutches (not illustrated) through a torque converter (not illustrated).

The engine 7 stops injecting fuel in response to an engine stop command from the ENG control module 6a, and restarts in response to an engine restart command.

The automatic transmission 8, in response to input signals from various sensors, converts the drive force inputted from the engine 7 into a given torque and speed according to a traveling state and a gear range selected by a vehicle driver, and transmits them to the drive wheels through a gear train and a differential (neither is illustrated).

The ENG control module 6a, in response to the input signals from the sensors, is executed by a processor 6e to output execution signals to automatically stop (idle stop) the engine 7 if an engine stop condition (depression of a brake pedal 9 continuing over a given period of time) is determined as satisfied, and restart the engine 7 after the automatic stop thereof if an engine restart condition (an accelerator pedal 10 is depressed) is determined as satisfied.

Next, the foot brake device 3 is described.

As illustrated in FIG. 1, the foot brake device 3 brakes two front and rear pairs of vehicle wheels 12 (drive wheels) by supplying to two front and rear pairs of hydraulic brake mechanisms 11, brake fluid pressurized according to depression of the brake pedal 9 (hereinafter, referred to as the hydraulic brake pressure).

The foot brake device 3 includes the brake pedal 9, a master cylinder 13, a booster 14, and the hydraulic brake mechanisms 11.

The booster 14 has a wall (not illustrated) movable in its axial directions in conjunction with the brake pedal 9, and boosts up the depression force of the brake pedal 9 by using a difference in pressure between a negative pressure chamber and an atmospheric pressure chamber which are divided from each other by the movable wall. The hydraulic brake mechanisms 11 provided to the respective vehicle wheels 12 are connected with the master cylinder 13 by a pipe (not illustrated), so as to apply a brake force to the respective vehicle wheels 12 according to the depression of the brake pedal 9 performed by the driver.

As illustrated in FIG. 1, each hydraulic brake mechanism 11 includes a rotor disk 15 provided with the vehicle wheel 12 to be integrally rotatable, and a caliper 16 for applying the brake force to the rotor disk 15. The caliper 16 has a caliper body mounted over the rotor disk 15, and an outer brake pad and an inner brake pad which are provided inside the caliper body and interpose the rotor disk 15 therebetween.

Next, the DSC system 4 is described.

The DSC system 4 brakes the vehicle wheels 12 independently from the depression of the brake pedal 9. The DSC system 4 performs an auto hold execution control (automatic stop control) in which a stopped state of the vehicle V is maintained starting when an auto hold execution condition (in an auto hold execution mode and the vehicle V is in the stopped state) is satisfied, until an auto hold release condition (the accelerator pedal 10 is depressed) is satisfied.

Note that the stopped state of the vehicle V is determined by using a determination condition, such as the depression of the brake pedal 9 continuing over a given period of time.

As illustrated in FIG. 2, the DSC system 4 is comprised of a DSC control module 6b and a pressurizer 17.

The DSC control module 6b is executed by the processor 6e to perform a DSC control so as to improve travel stability in turning the vehicle V in response to the input signals from the various sensors.

For example, when a turning attitude of the vehicle V is determined to be deviated by a given value or above based on detection signals from a yaw-rate sensor, a lateral acceleration sensor, and vehicle wheel speed sensors (none of these sensors are illustrated), the DSC control module 6b controls the brake force on the vehicle wheels 12 by operating the pressurizer 17, so as to orient the turning attitude of the vehicle V to a target direction by causing a yaw moment to act on a vehicle body.

Further the DSC control module 6b is executed by the processor 6e to perform an ABS control so as to prevent the respective vehicle wheels 12 from being locked in response to the input signals from the various sensors.

For example, when a slip ratio of each vehicle wheel 12 is calculated based on a detection signal of the vehicle wheel speed sensor and a vehicle wheel 12 for which the calculated slip ratio exceeds a given threshold is detected, the DSC control module 6b prevents the locking of this vehicle wheel 12 by controlling the operation of the pressurizer unit 17 to reduce the brake force which acts on the vehicle wheel 12.

The DSC system 4 has, in addition to the attitude control functions like the DSC control and the ABS control, a brake device function executable of the auto hold execution control in which the stopped state of the vehicle V is maintained.

When executing the auto hold execution control, the DSC control module 6b controls the pressurizer 17 to continuously hold an initial hydraulic brake pressure P0 according to the depression of the brake pedal 9 by the driver, and when canceling the auto hold execution control, the DSC control module 6b controls the pressurizer 17 to release the initial hydraulic brake pressure P0 at a given release rate.

Next, the electric parking brake (EPB) system 5 is described.

The EPB system 5 is driven independently from the depression of the brake pedal 9 and performs an auto parking execution control in which the stopped state of the vehicle V is maintained when a given condition is satisfied.

As illustrated in FIG. 2, the EPB system 5 is comprised of an EPB control module 6c and electric brake mechanisms 18.

The EPB control module 6c is executed by the processor 6e to control the vehicle wheel brake force of the electric brake mechanisms 18 in response to the input signals from the various sensors. For example, the EPB control module 6c controls the vehicle wheel brake force of the electric brake mechanisms 18 to a given load, based on an ON signal caused by a single push of a parking switch 23 (electric parking brake switch) or an execution command signal of the auto parking execution control.

Each electric brake mechanism 18 includes a piston, an annular member, and an electric motor (none of these are illustrated), rotationally drives the annular member by driving the electric motor, and moves the piston to progress/retreat with respect to the rotor disk 15.

Next, the ECU 6 is described.

The ECU 6 is comprised of the processor 6e (e.g., a CPU (Central Processing Unit)), a ROM, a RAM, an inside interface, and an outside interface. The processor 6e is configured to execute the various modules 6a to 6d of ECU 6 to perform their respective functions.

The ROM stores various programs and data for controlling the hydraulic brake pressure, and the RAM is provided with a processing area for the processor 6e to use when performing a series of processes.

When an auto hold switch 22 (automatic stop mode switch) is turned on to set the auto hold execution mode and the vehicle V is detected to be in the stopped state, which includes the automatic stop of the engine 7, the ECU 6 operates the brake device (here, the DSC system 4) to perform the auto hold execution control to maintain the stopped state of the vehicle V. When an ignition switch 24 (ignition state detector) is turned off in the auto hold execution control, the ECU 6 operates the EPB system 5 to perform the auto parking execution control in which the stopped state of the vehicle V is maintained, and cancels the auto hold execution control.

As illustrated in FIG. 2, the ECU 6 is electrically connected to a vehicle information detector 21, the auto hold switch 22, the parking switch 23, the ignition switch 24, a vehicle-mounted control device 30, etc.

Figure 4:
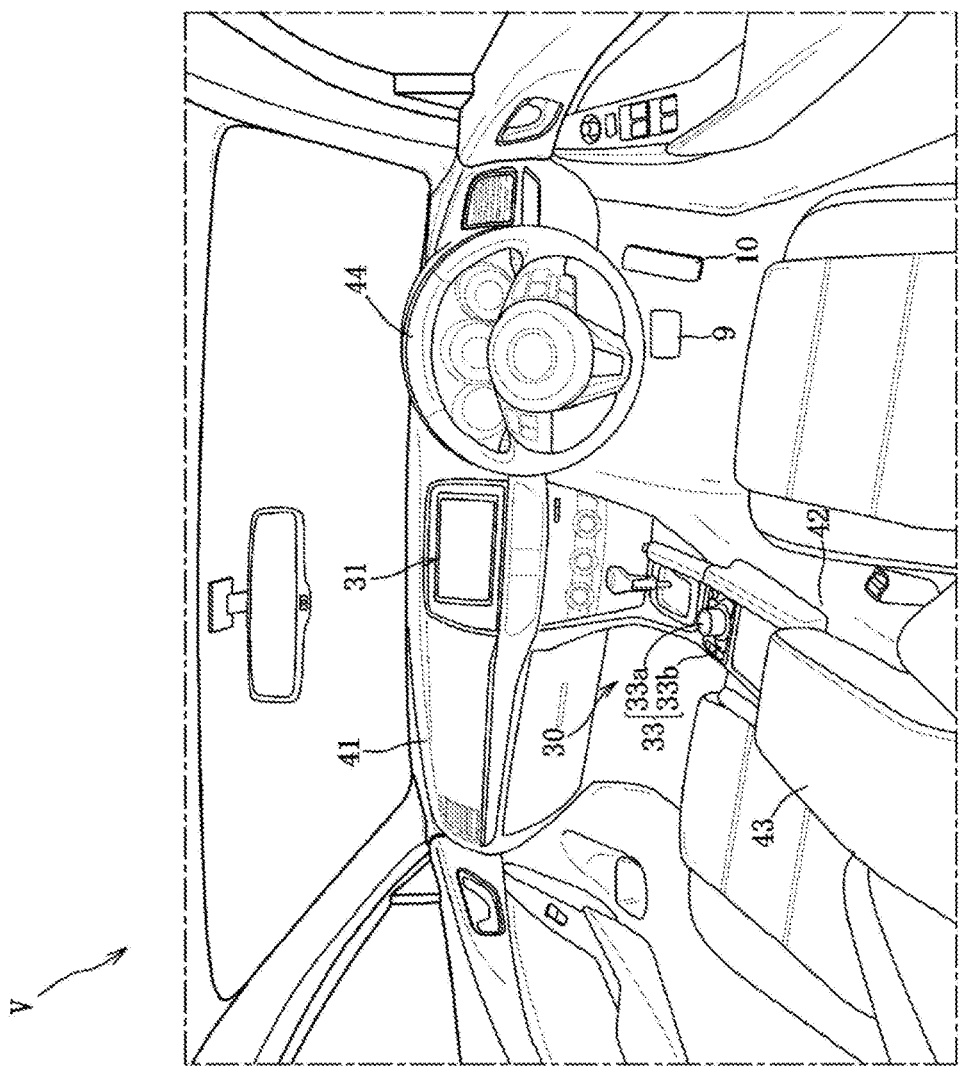
FIG. 4 is a view illustrating an inside of a cabin where a display and a multi commander are provided.

The vehicle information detector 21 is comprised of an accelerator sensor (not illustrated) for outputting a detection signal indicating a depressed amount of the accelerator pedal 10, the yaw-rate sensor for outputting a signal corresponding to a yaw rate of the vehicle V, the lateral acceleration sensor for outputting a signal relating to an acceleration of the vehicle V in vehicle width directions, the vehicle wheel speed sensors for outputting signals based on rotational speeds of the vehicle wheels 12, respectively, a steering angle sensor (not illustrated) for outputting a signal relating to a steering angle of a steering wheel 44 (see FIG. 4)

controlled by the driver, an engine speed sensor (not illustrated) for outputting a signal based on to an engine speed, a gradient sensor for outputting a signal based on an inclination of a road surface where the vehicle V is stopped, and a hydraulic brake pressure sensor (not illustrated) for detecting hydraulic brake pressure which applies brake force to the vehicle wheels 12.

Figure 6:
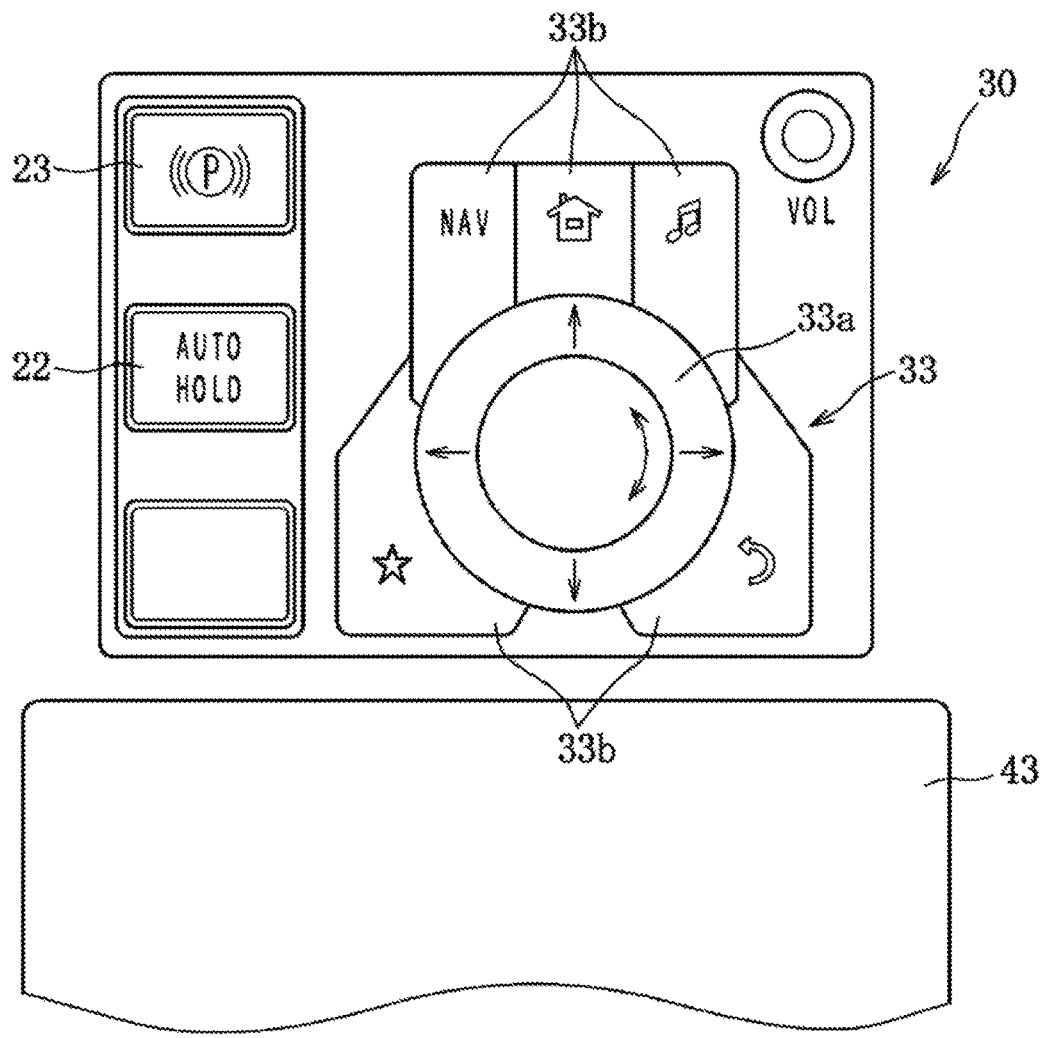
FIG. 6 is an enlarged view of a multi commander periphery part.

As illustrated in FIGS. 2 and 6, the auto hold switch 22 is configured by a momentary switch which outputs a signal of H– (logic high) level only when the switch operation is performed by the driver, otherwise outputs a signal of L– (logic low) level. The auto hold switch 22 is disposed in a center console 42 (see FIG. 4).

If the driver performs the switch operation in the auto hold release mode, the auto hold switch 22 is set to the auto hold execution mode. If the driver performs the switch operation in the auto hold execution mode, the auto hold switch 22 is set to the auto hold release mode.

Further, when the ignition switch 24 is turned off, the auto hold switch is forcibly set to an initial setting, the auto hold release mode.

As illustrated in FIGS. 2 and 6, the parking switch 23 is configured by a momentary switch which outputs a signal of H– (logic high) level only when a switch operation is performed by the driver, otherwise outputs a signal of L– (logic low) level. On a vehicle front side of an arm rest 43, the parking switch 23 is disposed further forward of the auto hold switch 22 and near the auto hold switch 22, either adjacent to it or in its vicinity.

When the parking switch 23 is turned on by a normal operation (e.g., single push operation) and the EPB system 5 is operated, the auto parking control is executed until the parking switch 23 is turned off by the similar normal operation.

Further the parking switch 23 is capable of receiving, in addition to the normal operation, a special operation.

When the parking switch 23 receives the special operation (e.g., consecutive pushes within one second), the auto hold control mode currently set by the auto hold switch 22 is forcibly switched to the other control mode.

The ignition switch 24 outputs the detection signal indicating the ON/OFF state of itself to the ECU 6.

The vehicle-mounted control device 30 controls a plurality of vehicle instruments 34 which are mounted on the vehicle V by the driver, and the DSC system 4.

Figure 3:
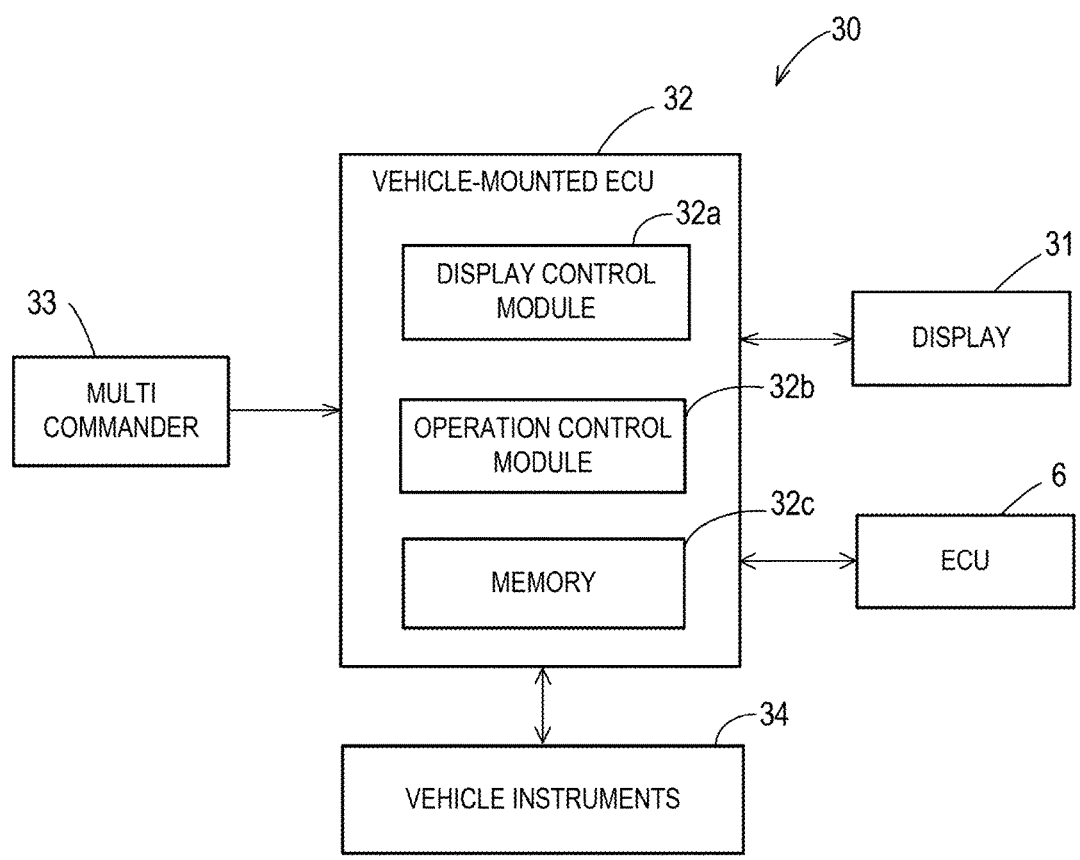
FIG. 3 is a block diagram of a vehicle-mounted control device.

As illustrated in FIG. 3, the vehicle-mounted control device 30 includes a display 31 (display unit, having a display screen), a vehicle-mounted ECU 32 (display controller), and a multi commander 33 (input device).

The vehicle instruments 34 includes an audio device, a vehicle-mounted mobile phone, and a navigation system (not individually illustrated), and each vehicle instrument 34 has a plurality of control items.

Figure 5:
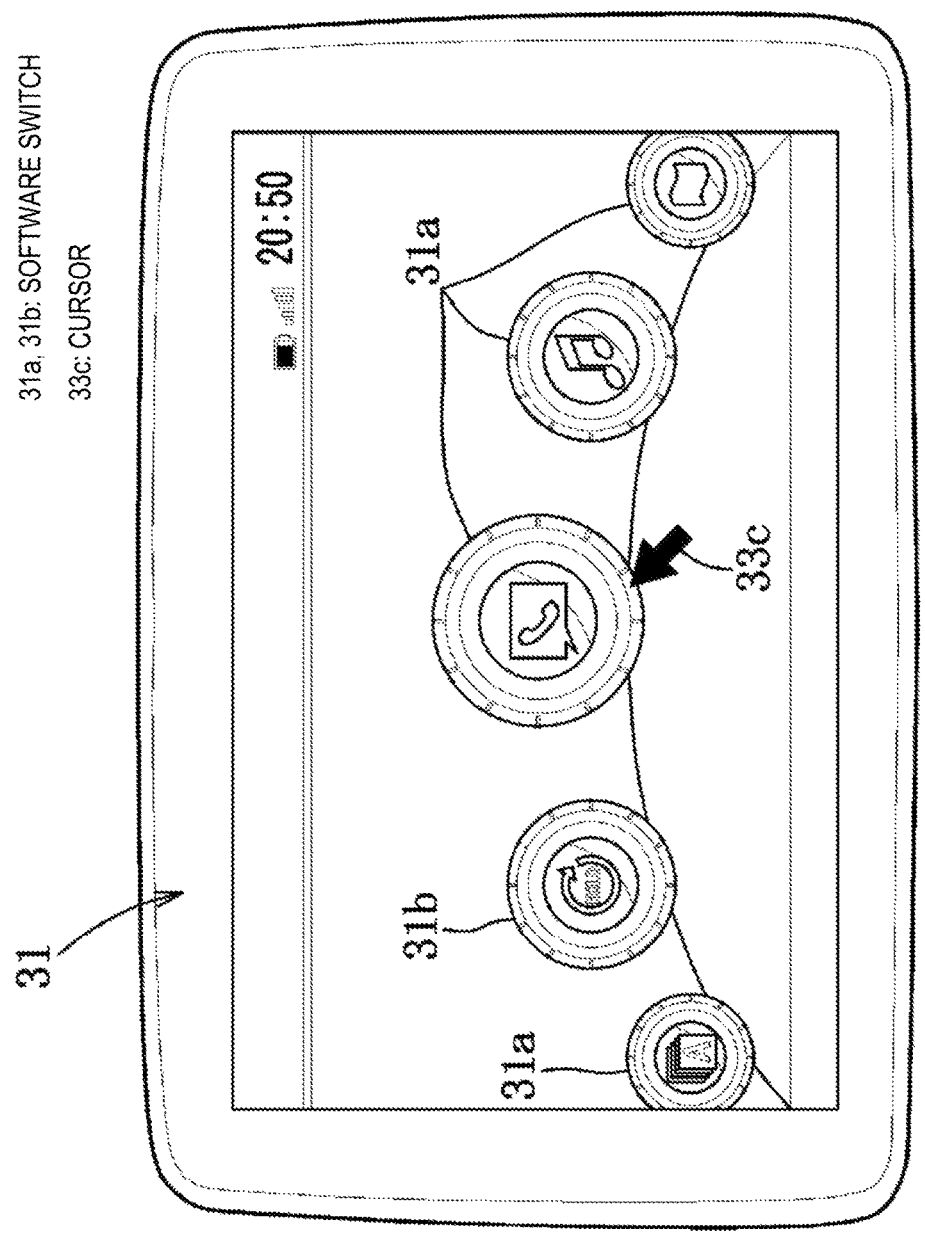
FIG. 5 is an enlarged view of a display periphery part.

As illustrated in FIGS. 4 and 5, the display 31 is attached to face a vehicle cabin rearward side, at an operable position by the driver which is near a center of an instrument panel 41 in vehicle width directions.

The display 31 is a touch panel type and provided with a plurality of software switches 31*a* and 31*b* (virtual control switches) corresponding to the control items displayed on the display 31, and the software switches 31*a* and 31*b* are capable of receiving a direct operation from a finger of the driver or an operation through the multi commander 33. Note that, a plurality of hardware switches (not illustrated) corresponding to the control items and capable of receiving a direct operation from the driver, are also disposed around the display 31.

As illustrated in FIGS. 4 and 6, the multi commander 33 is located on the center console 42 disposed between a driver's seat and a front passenger's seat, at a position where the driver is able to operate on the center console 42.

The multi commander 33 includes a rotary switch 33*a* and five push switches 33*b* on the front, left and right sides of the rotary switch 33*a*.

The rotary switch 33*a* performs forward, rearward, leftward and rightward tilting operations, a rotational operation about an up-and-down axis, and a push operation. The rotary switch 33*a* moves a cursor 33*c* displayed on the display 31 and selects the software switches 31*a* and 31*b* when the cursor 33*c* is placed on them, respectively.

When one of the push switches 33*b* is pushed, the cursor 33*c* is displayed at a displayed position of the soft switch 31*a* corresponding to the pushed switch 33*b*.

As illustrated in FIG. 3, the vehicle-mounted ECU 32 includes a display control module 32*a*, an operation control module 32*b*, and a memory 32*c*.

The display control module 32*a* is executable by a processor (not shown) to control the display contents on the display 31. The software switches 31*a* are displayed in association with a plurality of control items of the plurality of vehicle instruments 34, and the software switch 31*b* is displayed in association with a control item for auto hold control mode switching.

The operation control module 32*b* is executable by the processor to control the vehicle instruments 34 by outputting command signals to the vehicle instruments 34 based on the touch panel operation of the software switch 31*a*, the operation of the rotary switch 33*a*, and the push operations of the respective switches 33*b*.

When the cursor 33*c* is moved to a displayed position of one of the software switches 31*a* and 31*b* corresponding to an operation target and the rotary switch 33*a* is pushed at its upper surface, the operation control module 32*b* determines the control item which is the operation target, and starts the control of this control item. Since each control item has different subordinate items, after the control item is determined, a more specific control item is sequentially determined.

Moreover, the operation control module 32*b* outputs a command signal to the ECU 6 based on the touch panel operation of the software switch 31*b* or the operation of the rotary switch 33*a*, to set the auto hold control mode. For example when the cursor 33*c* is moved to the displayed position of the software switch 31*b* and the determination is performed, the operation control module 32*b* outputs a switch command signal so as to forcibly switch the auto hold control mode currently set by the auto hold switch 22 to the other control mode.

Further the memory 32*c* stores a mode flag F indicating the currently set auto hold control mode via the ECU 6. Therefore, when restarting the engine after the ignition switch 24 is turned off and then turned on again, the operation control module 32*b* outputs a command signal to the ECU 6 to execute the auto hold control mode which is set before the ignition switch 24 is turned off.

Note that in the auto hold execution mode, the mode flag F is 1, and in the auto hold release mode, the mode flag F is 0.

As illustrated in FIG. 2, the ECU 6 is integrally provided with the engine control module 6*a*, the DSC control module 6*b*, the EPB control module 6*c*, a mode setting module 6*d*, and the processor 6*e*.

The mode setting module 6*d* is executed by the processor 6*e* to set the control mode to the auto hold execution mode when the auto hold switch 22 is switched during the auto hold release mode, and set the control mode to the auto hold release mode when the auto hold switch 22 is switched during the auto hold execution mode. When the special operation of the parking switch 23 or the selection of the software switch 31*b* (determination of the control item) is made by the driver, the mode setting module 6*d* forcibly switches the currently set auto hold control mode to the other control mode.

Figure 7:
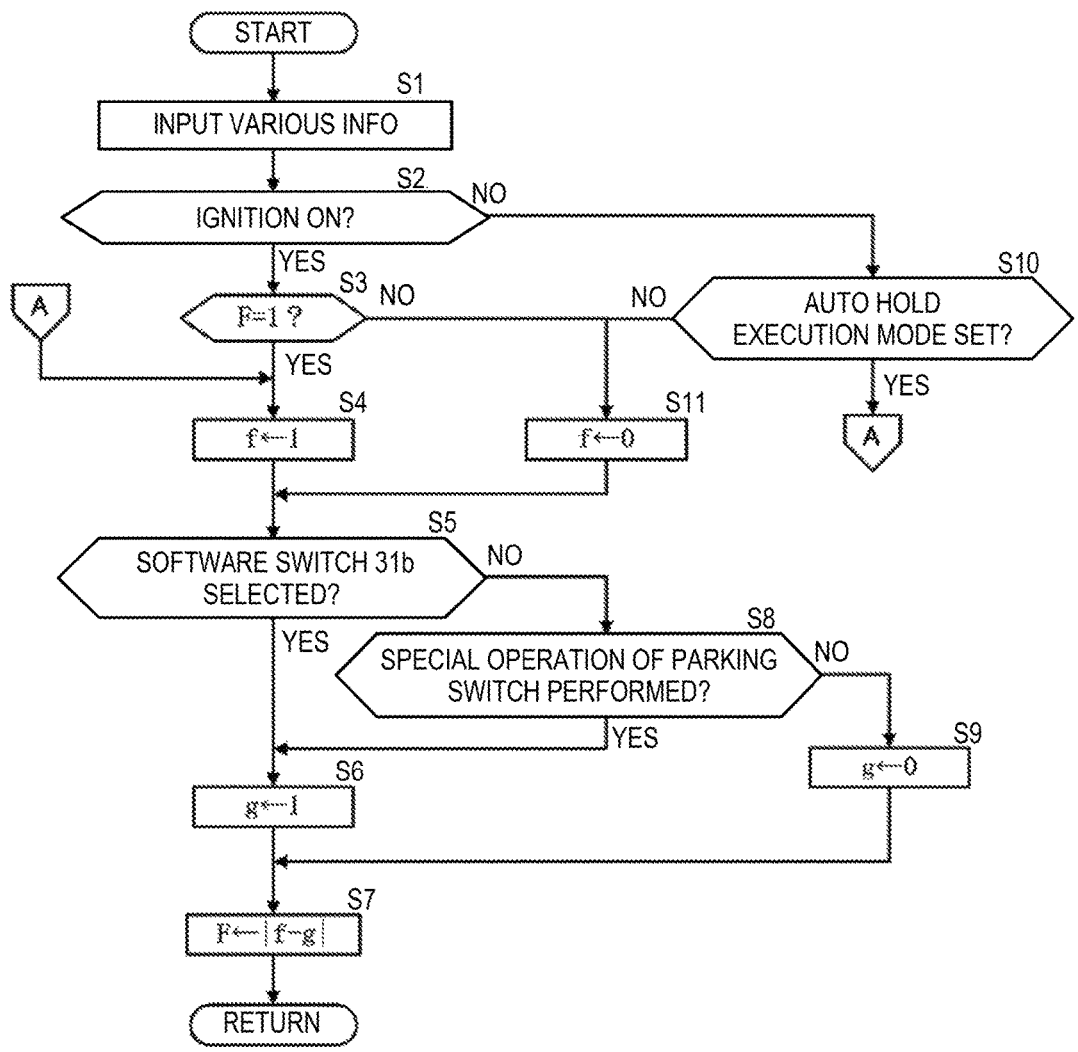
FIG. 7 is a flowchart of mode setting.

Next, procedures of mode setting process which is performed by the mode setting module 6*d* to set the auto hold control mode are described based on the flowchart of FIG. 7.

Note that in FIG. 7, Si (i=1, 2, . . . ) indicates a step for each process.

First in S1, information such as the detection values of the respective sensors and switches, and the mode flag F stored in the memory 32*c*, is read at this point, and then the process proceeds to S2.

In S2, whether or not the ignition switch 24 is turned on to start traveling is determined.

If the ignition switch 24 is on as a result of S2, since the engine is in restart after the ignition switch 24 is turned off once, the process proceeds to S3 where whether or not the mode flag F is 1 is determined.

If the mode flag F is 1 as a result of S3, since the control mode is the auto hold execution mode before the ignition switch 24 is turned off, a flag f is set to 1 (S4), and then the process proceeds to S5. If the mode flag F is 0 as the result of S3, since the control mode is the auto hold release mode before the ignition switch 24 is turned off, the flag f is set to 0 (S11), and then the process proceeds to S5.

In S5, whether or not the software switch 31*b* is selected is determined.

If the software switch 31*b* is selected as a result of S5, the current auto hold control mode is switched to the other control mode, then the process proceeds to S6 where a flag g is set to 1.

Then in S7, an absolute value obtained by subtracting the set value of the flag g from the set value of the flag f is set as the new value of the mode flag F, and then the process returns to the start of the process.

If the software switch 31*b* is not selected as a result of S5, the process proceeds to S8 where whether or not the special operation of the parking switch 23 is performed is determined.

If the special operation of the parking switch 23 is performed as a result of S8, since the current auto hold control mode is switched to the other control mode, the process proceeds to S6 where the flag g is set to 1, and if the special operation is not performed as the result of S8, the flag g is set to 0 (S9), and then the process proceeds to S7.

If the ignition switch 24 is not turned on as the result of S2, since the vehicle is traveling by the driver, the process proceeds to S10 where whether the auto hold execution mode is set is determined.

If the auto hold execution mode is set as a result of S10, the process proceeds to S4.

If the auto hold execution mode is not set as the result of S10, since the current control mode is the auto hold release mode, the process proceeds to S11.

Figure 8:
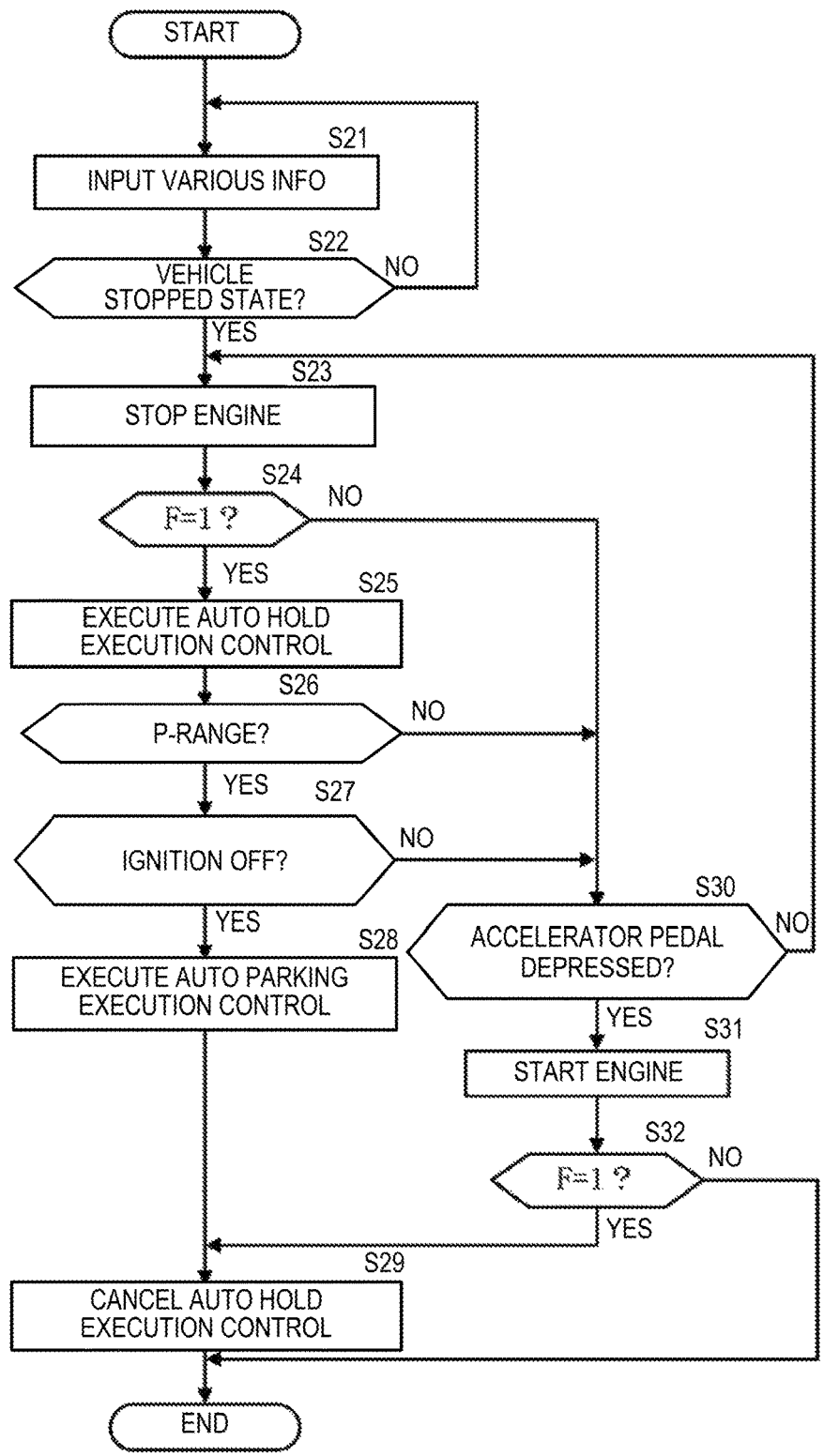
FIG. 8 is a flowchart of stop maintaining control process.

Next, procedures of stop maintaining control process performed by the ECU 6 are described based on the flowchart of FIG. 8.

First in S21, various information is read and the process proceeds to S22.

In S22, whether or not the vehicle V is in the stopped state is determined.

If the vehicle V is in the stopped state as a result of S22, the process proceeds to S23 where the engine 7 is stopped. If the vehicle V is not in the stopped state as the result of S22, the process returns to the start of the process.

Then in S24, whether or not the mode flag F set in the mode setting process is 1 is determined.

If the mode flag F is 1 as a result of S24, since the currently selected control mode by the driver is the auto hold execution mode, the auto hold execution control is executed (S25).

Then in S26, whether or not a gear range is a P-range (parking range) is determined.

If the gear range is the P-range as a result of S26, the process proceeds to S27 where whether or not the ignition switch 24 is turned off is determined.

If the ignition switch 24 is turned off as a result of S27, the auto parking execution control is executed (S28).

After the auto parking execution control, the auto hold execution control is canceled (S29) and then the process ends.

If the mode flag F is 0 as the result of S24, since the auto hold release mode is currently selected by the driver, the process proceeds to S30 without executing the auto hold execution control.

In S30, whether or not the accelerator pedal 10 is depressed is determined.

If the accelerator pedal 10 is depressed as a result of S30, the process proceeds to S31 where the engine 7 is restarted.

Then in S32, whether or not the mode flag F set in the mode setting process is 1 is determined.

If the mode flag F is 1 as a result of S32, since the auto hold execution control is under execution, the process proceeds to S29. If the mode flag F is 0 as the result of S32, since the auto hold execution control is not executed, the process ends.

If the accelerator pedal 10 is not depressed as the result of S30, such that the engine 7 remains stopped, the process returns to S23.

Next, operations and effects of the stop maintaining system 1 are described.

According to the stop maintaining system 1 of this embodiment, since the parking switch 23 and the vehicle-mounted control device 30 which control the DSC system 4 in response to a given operation by the driver are provided, even if an abnormality in the switch operation of the auto hold switch 22 occurs, one of the parking switch 23 and the vehicle-mounted control device 30 sets the auto hold control mode intended by the driver. The ECU 6 switches the current ON/OFF state selected by the auto hold switch 22 to the other state when one of the parking switch 23 and the vehicle-mounted control device 30 receives the given operation from the driver. Therefore, even during traveling of the vehicle V, it is possible to change the mode state with the simple operation without requiring the mode state confirmation from the driver, and change the control mode even with the abnormality in the switch operation of the auto hold switch 22.

The vehicle-mounted control device 30 for operating the plurality of control items of the vehicle instruments 34 and the DSC system 4 is provided as a control mechanism. The vehicle-mounted control device 30 includes the touch panel display 31 which has the display screen for displaying the plurality of software switches 31*a* and 31*b* corresponding to the control items, respectively, and the cursor 33*c* capable of pointing at the software switches 31*a* and 31*b*, and receives the direct operation regarding the software switches 31a and 31b by the driver, the multi commander 33 disposed to be separated from the display screen and for moving the cursor 33c, and the vehicle-mounted ECU 32 for controlling the display contents on the display screen.

Thus, it is possible to easily switch the auto hold control mode from the mode associated with the signal level to the other mode by one of the direct operation on the software switch 31b and the operation through the multi commander 33.

The ignition switch 24 for detecting the ignition state of the vehicle V is provided, and the vehicle-mounted ECU 32 has the memory 32c for storing the ON/OFF state selected by the auto hold switch 22. When restarting the engine after the ignition switch 24 is turned off once, the ECU 6 automatically sets to the ON/OFF state selected before the ignition switch 24 is turned off.

Thus, when restarting the engine after the ignition switch 24 is turned off once, it is possible to automatically set the control mode selected by the driver before the ignition switch 24 is turned off, without another switch operation of the auto hold switch 22 by the driver.

The EPB system 5 for braking the vehicle wheels 12 by operating the electric brake mechanisms 18 which are driven by the electric motors independently from the depression of the brake pedal 9 is provided. The control mechanism includes the parking switch 23 for controlling the operation of the EPB system 5.

Thus, it is possible to easily switch the auto hold control mode from the mode associated with the signal level to the other mode by the operation of the parking switch 23.

When the parking switch 23 is operated a plurality of times within a given period of time, the ECU 6 switches the ON/OFF state currently selected by the auto hold switch 22 to the other state. Thus, it is possible to accurately control the selection of the auto hold control mode and the operation of the EPB system 5 with the single operation of the parking switch 23.

Since the parking switch 23 is located near the auto hold switch 22, it is possible to intentionally and smoothly select the auto hold control mode with the operation of the parking switch 23.

Next, modifications designed by partially changing the embodiment are described.

(1) The embodiment described above provides the example in which the control mechanism includes the parking switch and the vehicle-mounted control device; however, the control mechanism may be one of them, or a different switch may be provided as the control mechanism. Further the special operation of the parking switch and the determining operation by the vehicle-mounted control device are given as the examples of the given operation of the control mechanism; however, various operation modes (e.g., consecutive pushes or holding a single push for a given period of time) may be set as long as the driver can differentiate it from the normal operation.

(2) The embodiment described above provides the example of prioritizing the determining operation by the vehicle-mounted control device over the special operation of the parking switch; however, the special operation of the parking switch may be prioritized over the determining operation by the vehicle-mounted control device. Alternatively, the determining operation by the vehicle-mounted control device and the special operation of the parking switch may be provided at the same level of priority.

(3) The embodiment described above provides the example of disposing the auto hold switch on the center console; however, it may be disposed on the instrument panel or a steering wheel.

In this case, the parking switch which is the control mechanism is preferably located near the auto hold switch.

(4) Moreover, those skilled in the art may implement the present invention in a variety of other modes by adding various changes to the embodiment without departing from the scope of the present invention, and such modes fall under the scope of the present invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

V Vehicle
1 Stop Maintaining System
3 Foot Brake Device
4 DSC System
6 ECU
9 Brake Pedal
11 Hydraulic Brake Mechanism
12 Vehicle Wheel
17 Pressurizer
18 Electric Brake Mechanism
22 Auto Hold Switch
23 Parking Switch
24 Ignition Switch
30 Vehicle-mounted Control Device
31 Display
31a, 31b Software Switch
32 Vehicle-mounted ECU
33 Multi Commander
33c Cursor

What is claimed is:

1. A vehicle stop maintaining system comprising:
a foot brake mechanism for braking vehicle wheels through hydraulic brake mechanisms;
a brake force control mechanism having a pressurizer that increases hydraulic brake pressure to be applied to the hydraulic brake mechanisms, and for braking the vehicle wheels by controlling the pressurizer independently from depression of a brake pedal;
a first controller comprising a processor configured to maintain a stopped state of the vehicle by operating the brake force control mechanism when the stopped state is detected, and operating an automatic stop control in which hydraulic brake pressure is released when a hydraulic brake pressure release condition is satisfied;
an automatic stop mode switch for selecting one of ON and OFF states of the automatic stop control upon receiving an input from a vehicle driver, the ON state corresponding to execution of the automatic stop control, the OFF state corresponding to prohibition of the automatic stop control;
a control mechanism for controlling a given mechanism that is different from the brake force control mechanism, and operating the brake force control mechanism in response to a given operation by the driver; and
a second controller comprising a memory for storing the selected one of the ON and OFF states, wherein when the given operation is performed on the control mechanism by the driver, the first controller switches the selected one of the ON and OFF states to the other state, and wherein when switching an ignition state on after switching off once, the second controller automatically applies the one of the ON and OFF states selected before the ignition state is switched off.

2. The system of claim 1, wherein the control mechanism is a control device for operating a plurality of control items of vehicle instruments and the brake force control mechanism, and includes:

a touch panel display unit that has a display screen for displaying a plurality of virtual control switches corresponding to the control items, respectively, and a cursor for indicating the virtual control switches, and receives a direct operation from the driver on the virtual control switches displayed on the display screen;

an input device disposed to be separated from the display screen and for moving the cursor; and a display controller comprising a processor for controlling display contents on the display screen.

3. The system of claim 2, further comprising an electric parking brake mechanism for braking the vehicle wheels by operating electric brake mechanisms that are driven by electric actuators, respectively, independently from depression of a brake pedal, wherein the control mechanism includes an electric parking brake switch for controlling the operation of the electric parking brake mechanism.

4. The system of claim 3, wherein when the electric parking brake switch is operated a plurality of times within a given period of time, the controller switches the selected one of the ON and OFF states to the other state.

5. The system of claim 4, wherein the electric parking brake switch is located near the automatic stop mode switch.

6. The system of claim 3, wherein the electric parking brake switch is located near the automatic stop mode switch.

7. The system of claim 1, further comprising an electric parking brake mechanism for braking the vehicle wheels by operating electric brake mechanisms that are driven by electric actuators, respectively, independently from depression of a brake pedal, wherein the control mechanism includes an electric parking brake switch for controlling the operation of the electric parking brake mechanism.

8. The system of claim 7, wherein the electric parking brake switch is located near the automatic stop mode switch.

9. A vehicle stop maintaining system comprising:

a foot brake mechanism for braking vehicle wheels through hydraulic brake mechanisms;

a brake force control mechanism having a pressurizer that increases hydraulic brake pressure to be applied to the hydraulic brake mechanisms, and for braking the vehicle wheels by controlling the pressurizer independently from depression of a brake pedal;

a first controller comprising a processor configured to maintain a stopped state of the vehicle by operating the brake force control mechanism when the stopped state is detected, and operating an automatic stop control in which hydraulic brake pressure is released when a hydraulic brake pressure release condition is satisfied;

an automatic stop mode switch for selecting one of ON and OFF states of the automatic stop control upon receiving an input from a vehicle driver, the ON state corresponding to execution of the automatic stop control, the OFF state corresponding to prohibition of the automatic stop control;

an ignition switch for detecting an ignition state of the vehicle; and a control mechanism for controlling a given mechanism that is different from the brake force control mechanism, and operating the brake force control mechanism in response to a given operation by the driver, wherein the control mechanism is a control device for operating a plurality of control items of vehicle instruments and the brake force control mechanism, and includes:

a touch panel display unit that has a display screen for displaying a plurality of virtual control switches corresponding to the control items, respectively, and a cursor for indicating the virtual control switches, and receives a direct operation from the driver on the virtual control switches displayed on the display screen;

an input device disposed to be separated from the display screen and for moving the cursor; and a display controller comprising a processor for controlling display contents on the display screen, wherein when the given operation is performed on the control mechanism by the driver, the controller switches the selected one of the ON and OFF states to the other state, wherein the display controller has a memory for storing the selected one of the ON and OFF states, and wherein when switching the ignition state on after switching off once, the display controller automatically applies the one of the ON and OFF states selected before the ignition state is switched off.

10. The system of claim 9, further comprising an electric parking brake mechanism for braking the vehicle wheels by operating electric brake mechanisms that are driven by electric actuators, respectively, independently from depression of a brake pedal, wherein the control mechanism includes an electric parking brake switch for controlling the operation of the electric parking brake mechanism.

11. The system of claim 10, wherein when the electric parking brake switch is operated a plurality of times within a given period of time, the controller switches the selected one of the ON and OFF states to the other state.

12. The system of claim 11, wherein the electric parking brake switch is located near the automatic stop mode switch.

13. The system of claim 10, wherein the electric parking brake switch is located near the automatic stop mode switch.

14. A vehicle stop maintaining system comprising:

a foot brake mechanism for braking vehicle wheels through hydraulic brake mechanisms;

a brake force control mechanism having a pressurizer that increases hydraulic brake pressure to be applied to the hydraulic brake mechanisms, and for braking the vehicle wheels by controlling the pressurizer independently from depression of a brake pedal;

a controller comprising a processor configured to maintain a stopped state of the vehicle by operating the brake force control mechanism when the stopped state is detected, and operating an automatic stop control in which hydraulic brake pressure is released when a hydraulic brake pressure release condition is satisfied;

an automatic stop mode switch for selecting one of ON and OFF states of the automatic stop control upon receiving an input from a vehicle driver, the ON state corresponding to execution of the automatic stop control, the OFF state corresponding to prohibition of the automatic stop control;

a control mechanism for controlling a given mechanism that is different from the brake force control mechanism, and operating the brake force control mechanism in response to a given operation by the driver; and an electric parking brake mechanism for braking the vehicle wheels by operating electric brake mechanisms that are driven by electric actuators, respectively, independently from depression of a brake pedal, wherein when the given operation is performed on the control mechanism by the driver, the controller switches the selected one of the ON and OFF states to the other state, wherein the control mechanism includes an electric parking brake switch for controlling the operation of the electric parking brake mechanism, and wherein when the electric parking brake switch is operated a plurality of times within a given period of time, the controller switches the selected one of the ON and OFF states to the other state.

15. The system of claim 14, wherein the electric parking brake switch is located near the automatic stop mode switch.

* * * * *